Nov. 11, 1952   J. P. JONES   2,617,493
SEPARATION OF HYDROCARBONS FROM NONHYDROCARBONS BY DIFFUSION
Filed April 15, 1946   3 Sheets-Sheet 1

*INVENTOR.*
JEAN P. JONES
BY *Hudson & Young*
ATTORNEYS

FIG. 4B

Patented Nov. 11, 1952

2,617,493

UNITED STATES PATENT OFFICE 2,617,493

SEPARATION OF HYDROCARBONS FROM NONHYDROCARBONS BY DIFFUSION

Jean P. Jones, Bartlesville, Okla., assignor to Phillips Petroleum Company, a corporation of Delaware Application April 15, 1946, Serial No. 662,151

12 Claims. (Cl. 183—115)

This invention relates to the removal of non-hydrocarbon constituents from hydrocarbon materials. In one embodiment of this invention it relates to the removal of inert materials such as nitrogen, oxygen and/or water from hydrocarbon materials. In another embodiment of the invention it relates to the removal of odorous compounds such as volatile mercaptans, volatile oxygen-containing compounds, such as aldehydes of low molecular weight, hydrogen sulfide, and the like, from hydrocarbon materials. Still another embodiment of this invention relates to the removal of both of said undesired types of said materials from hydrocarbons. In specific applications of each of the foregoing embodiments of the invention, preferred embodiments relate to the treatment of normally gaseous mixtures in which the hydrocarbons are paraffin hydrocarbons and which are essentially free from unsaturated hydrocarbons, such as olefins, diolefins, acetylenes, aromatic hydrocarbons, and the like.

I have found that non-porous membranes can be used to effect separations such as just discussed. I have also found that undesired compounds of the class consisting of nitrogen, oxygen and water are less soluble in certain types of non-porous membranes than are hydrocarbon materials and that certain hydrocarbon materials, especially the normally gaseous paraffin hydrocarbons, are less soluble in similar membranes than are odorous compounds such as formaldehyde, low-boiling mercaptans, hydrogen sulfide, and the like. The membranes which can be used in the practice of my invention have rubber as a base, although they generally are not pure rubber since it is preferred that the rubber be compounded with other materials, such as carbon black, sulfur, and sulfur compounds. By rubber I intend to include natural rubber and various types of synthetic materials now well-known to the art as "synthetic rubber," such as polymers of butadiene and its homologues and derivatives, rubber-like olefin polymers such as those formed from isobutylene at low temperatures in the presence of a Friedel-Crafts type catalyst, polymers between these hydrocarbons just mentioned and other unsaturated organic compounds, such as acrylic acid and its homologues, derivatives and esters, acrylonitrile, and the like. Many of such synthetic rubbers are not highly suited for use in my invention since the hydrocarbon materials discussed herein are not as soluble in such rubbers as they are in other rubbers. On the other hand, where the solubility and chemical characteristics of the materials undergoing treatment are such that the rubber is unduly swelled and structurally weakened by having the hydrocarbons and/or odorous compounds dissolved therein, such rubbers, or compounded materials, will not be well suited to use in the invention. The most favorable material for use in the treatment of any particular mixture can be readily selected from the results of sample tests made in the light of the present disclosure.

It is an object of my invention to remove non-hydrocarbon impurities from hydrocarbon-containing mixtures.

Another object of my invention is to reduce the odor in hydrocarbon-containing materials.

Still another object of my invention is to reduce the nitrogen content of normally gaseous mixtures containing nitrogen and normally gaseous paraffin hydrocarbons.

Further objects and advantages of my invention will become apparent to one skilled in the art from the accompanying disclosure and discussion.

The objects of my invention are attained by contacting a hydrocarbon-containing mixture, such as is discussed herein, with a relatively non-porous membrane under conditions such that the components of the mixture which are the more soluble in the material of which the membrane is constructed dissolve in the membrane, and are removed from the opposite side of the membrane in a higher state of relative concentration than they are present in the mixture initially contacted with the membrane. The process of each of the various modifications of the invention is carried out by introducing the initial mixture into an intermediate stage of a seres of separation stages. Each of these stages comprises two zones separated by a non-porous membrane of the type discussed herein. In each of said stages a mixture of materials is introduced into one of these two zones which will be designated herein and in the claims as a "diffusion zone." From each of these diffusion zones a material is discharged which is relatively poorer in the component of the charged mixture which is the more soluble in the material from which the membrane is made. The other zone of each of said stages is referred to herein and in the claims as a "diffusate zone." This diffusate zone receives the components of the mixture introduced into the diffusion zone solely by passage of said materials through the membrane, and primarily by evaporation from the surface of the membrane, and there is discharged from this diffusate zone a material which is relatively richer in the component of the said mixture which is the more soluble than the substance from which the membrane was made. Although the terms "diffusion" and "diffusate" are used herein, it is to be clearly understood that such terms are based upon diffusion of solute molecules in solution in the membrane material, which is the solvent.

The mixture charged to each stage may be charged thereto either in the liquid state, or in the gaseous state, or as a physical mixture of liquid and gas. However, preferred operation is carried out with the introduction of such a mixture in the gaseous state. In the most preferred operation the material present in the diffusate zone is present therein and removed therefrom in the gaseous state. This removal may be effected by continuously maintaining an appreciably lower total pressure in the diffusate zone than that maintained in the diffusion zone. If desired, however, substantially the same total pressure may be maintained in both zones by introducing into the diffusate zone a substance which is substantially insoluble in the material from which the membrane is made and which is more readily separated from the component being concentrated in the diffusate zone than are the components of the mixture charged to the diffusion zone. In such a case the partial pressure of the material being concentrated in the diffusate zone will be appreciably lower than is its partial pressure in the diffusion zone.

The membrane which separates the two zones in each stage should be substantially non-porous, that is, the process of the invention is carried out so that the material which passes through the membrane does so by virtue of being dissolved in the membrane and being removed from the resulting solution from the opposite side of the membrane. Passage of materials through the membrane by virtue of differences in average molecular speeds of gaseous molecules, due to differences in molecular weights, should play no more than a negligible role, if any, in the process of the invention as practiced. For this reason mixtures which contain appreciable proportions of hydrogen and/or helium are not suitable for separation in accordance with my invention since the average molecular speeds of the molecules of these elements are so much higher than those of other compounds that they tend to offset the operation of the process even when non-porous membranes are used.

The membranes used in the practice of this invention should be as thin as is practicable while at the same time maintaining an essentially non-porous character. Membranes thinner than about 0.0001 inch are generally not practicable while membranes thicker than about 0.1 inch are generally so thick that the materials which dissolve in them take too long to pass through them and be removed from the opposite side by vaporization. This slows up the process and makes an extremely high gradient in the concentration of the dissolved material between the surface of the membrane on the diffusion-zone side and the surface of the membrane on the diffusate-zone side. Preferably the membrane will be between about 0.0005 and about 0.005 to 0.01 inch. When there is a high pressure differential between the two sides of the membrane it is necessary to support the membrane by some relatively strong mechanical support, such as a wire screen, or a grid, or a porous wall of ceramic material. The latter is the less desirable since the material vaporizing from the low pressure side of the membrane does not have ready access to the space in the diffusate zone. If desired the supporting grid and the membrane may be manufactured together as an integral structure or the membrane may be laid against a separate support. It is preferred that the membrane, if it is made of an elastic material, be not greatly stretched since its use in the process of my invention tends somewhat to weaken it structurally. The pressure in the diffusate zone may be any desired pressure which is such that the partial pressure of the material which is more soluble in the membrane is lower in the diffusate zone than it is in the diffusion zone. A high pressure (or partial pressure) in the diffusion zone promotes solution of the more soluble component in the membrane, while a low pressure (or partial pressure) in the diffusate zone promotes removal of dissolved material from the membrane. Preferred operation is obtained when no extraneous material is introduced into the diffusate zone and when the partial pressure of the material being enriched in the diffusate zone is equivalent to between about 0.01 and about 0.5 times its pressure in the diffusion zone, preferably 0.05 to 0.2 times such partial pressure. Pressures in the diffusion zone may be between about 5 and about 500 pounds per square inch absolute.

The thickness of the diffusate zone is preferably such that there is not too great a pressure differential between a point of discharge of material from the zone and a point in the zone farthest removed from any such discharge point. It is preferred that such a pressure drop be as low as is practical and not greater than 10 per cent of the total pressure. The thickness of the diffusion zone should be such that there is not a large pressure drop between the inlet and discharge points of said zone and should be correlated with the width and length of the diffusion zone so that there will be relatively uniform flow of the mixture passing through the zone. There should be a minimum of opportunity for recirculating currents within the diffusion zone. The mixture passing through the zone, either liquid or vapor, is preferably passed through under conditions of turbulent flow so that, as the concentration of the material more soluble in the membrane decreases, there will be adequate contact between the flowing mixture and the membrane. One, or more than one, inlet and one, or more than one, outlet may be employed for the diffusion zone and likewise one, or more than one, outlet may be employed for the diffusate zone. The temperature of the operation should be as high as is permissible, depending primarily upon the physical characteristics of the material which forms the membrane and upon the adverse effects of temperature, and of the material dissolved in the membrane, upon the physical strength of the membrane. A preferred temperature of operation will generally be found between about 50 and about 300° F.

Various modifications of my invention will now be described in connection with the accompanying drawings, which show diagrammatically various arrangements of the stages which can be used to advantage in the practice of various modifications of the invention. Figures 4A and 4B illustrate an arrangement of stages for separating into their products the materials present in a three-component mixture. In each of these drawings are shown a plurality of separation stages, each stage being individually identified by a reference numeral. Each stage is composed of a diffusion zone A and a diffusate zone B, separated by a membrane C. Since it is desired to make the drawings as simple as possible, not all of the various lines or conduits through which materials pass have been individually identified with distinguishing characters, but in each instance where a line has been individually identified a line carrying a discharged diffusate bears an identification character consisting of the numeral identifying the stage from which it comes plus the letter "D," and a line carrying an effluent discharged from a diffusion zone bears an identification character consisting of the numeral identifying the stage from which it comes plus the letter "E." If necessary, any individual diffusion zone, diffusate zone or membrane can be identified by adding the numeral identifying the individual stage before the letter A, B, or C, as the case might be.

Figure 1:
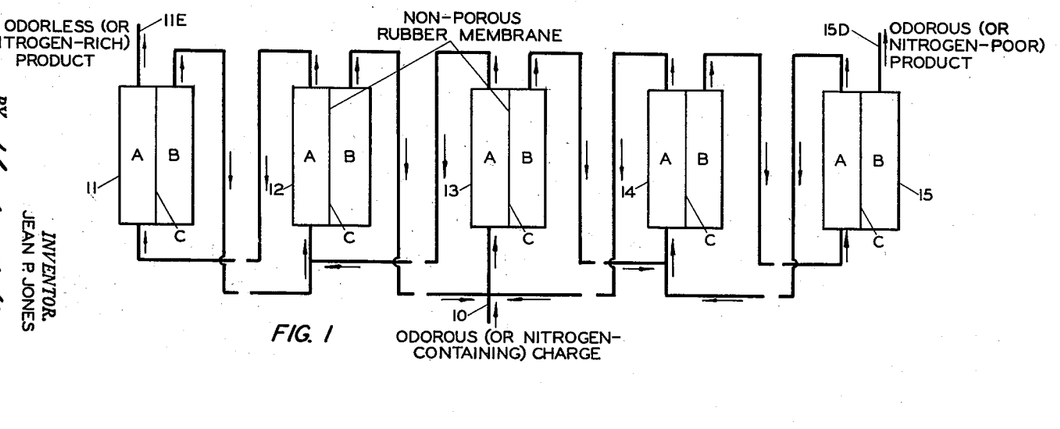
Figure 1 illustrates the most simple arrangement of stages for separating a two-component mixture.

Referring now to Figure 1, the simplest modification of my invention is illustrated for separating a substantially two-component mixture into each of its desired components. While it is realized that the various hydrocarbons will have different solubilities in the membrane used in each separation stage, the hydrocarbons in the charge stock are considered collectively as one component and the non-hydrocarbon materials, such as nitrogen, oxygen or water on the one hand, or odorous materials on the other hand, are in each case likewise considered as one component. A charge stock containing desired hydrocarbon and undesired less-soluble material, such as nitrogen, is introduced into the separation system through line 10 leading to the diffusion zone of stage 13. In this embodiment the separation is illustrated by means of 5 stages numbered from 11 to 15, inclusive. The stage from which a product of the process is discharged from the diffusion zone is indicated as being the lowest stage of the series and the stage from which a product of the process is discharged from the diffusate zone is designated as being the highest stage of the series. In the process of Figure 1 the effluent discharged from the diffusion zone of each stage except the lowest is passed to the diffusion zone of the next lowest stage and the diffusate from the diffusate zone of each stage except the highest is passed to the charge of the diffusion zone of the next higher stage. It will be readily appreciated that any number of stages may be used, both below and above the main-inlet stage, depending upon the characteristics of the membrane used with respect to the constituents to be separated, upon the temperature used in each stage, the pressure differential between the two zones of each stage, and upon the length of the path of the material flowing through each diffusion zone. In Figure 1 breaks have been shown in the lines joining adjacent stages to indicated that the number of stages may be increased or decreased at the points where breaks are shown. In the case under discussion a hydrocarbon material relatively poor in nitrogen, or in many instances essentially free from nitrogen, is removed as a product of the process through line 15D and a nitrogen-concentrate poor in its hydrocarbon content is removed as a product of the process through line 11E. This material will contain a higher proportion of hydrocarbons, in most instances, than the proportion of nitrogen contained in the product removed through 15D, since the latter product is passed through a membrane a plurality of times while the former product has only been submitted to the solvent action of a membrane.

As is indicated on the drawing of Figure 1, a similar arrangement of separation stages may be used to separate from a hydrocarbon material an odorous compound, such as a small quantity of formaldehyde which is often present in gases discharged from chemical conversion plants. In this instance the desired hydrocarbon product is recovered through line 11E and the stream which contains a substantially higher proportion of the odorous compound is discharged from the system through line 15D. The arrangement shown in Figure 1 is more suited to this latter type of operation than it is to the selective elimination of nitrogen.

Figure 2:
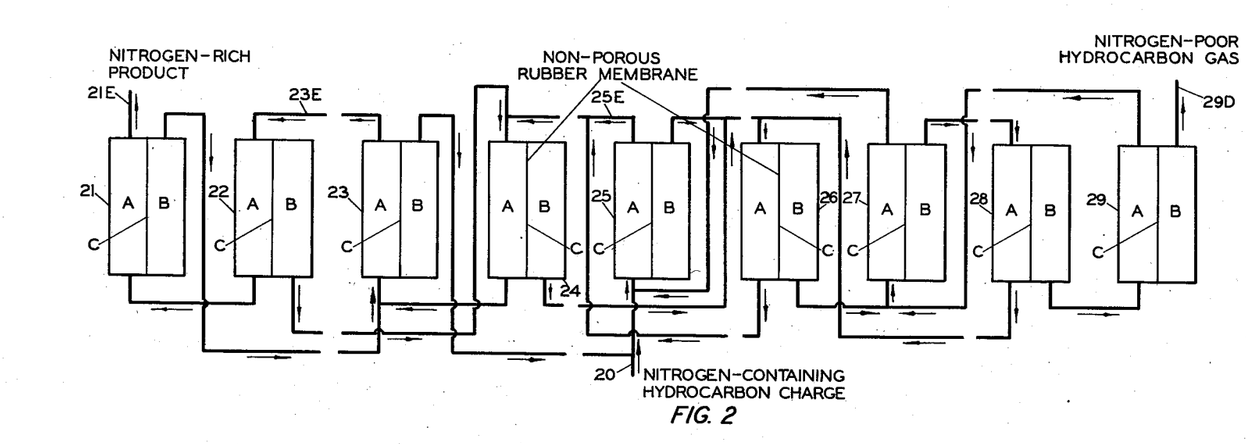
Figures 2 and 3 represent somewhat more complicated arrangements which, however, can very often be used more satisfactorily than the arrangements shown in Figure 1.

The arrangement of separation stages shown in Figure 2 is one modification which is better for the elimination of nitrogen from a hydrocarbon-nitrogen mixture. A mixture comprising between about 70 or 80 per cent gaseous paraffin hydrocarbons, primarily methane, with the remainder of the mixture being primarily nitrogen, is frequently found as a product of gas wells in certain areas of the United States, notably the Texas Panhandle. Such a material can be successfully treated in the modification of my invention illustrated by Figure 2, which comprises nine stages numbered 21 to 29. In this modification the charge is introduced through line 20, and the effluent discharged from the diffusion zone of the main-inlet stage 25 and from the diffusion zones of each of the lower stages is passed to the charge of the diffusion zone of the next lower stage, with a nitrogen-rich effluent being removed from the diffusion zone of the lowest stage, as through line 21E. The discharged diffusate from each of these lower stages is passed to the charge of the diffusion zone of the second higher stage. The diffusate discharged from the diffusate zone of the main-inlet stage and from the diffusate zone of each of the stages higher in the series is passed to the charge of the diffusion zone of the next higher stage in the series, with a nitrogen-poor hydrocarbon gas being removed from the diffusate zone of the highest stage as through line 29D. The effluent discharged from the diffusion zone of each of these higher stages is passed to the charge of the diffusion zone of the second lower stage. The process of Figure 2 has been illustrated by the use of nine separation stages but, as will be readily appreciated by one skilled in the art, any desired number of stages may be used, both above and below the main-inlet stage. Below the main-inlet stage breaks have been shown in the lines which serve to connect stages 23 and 24 with the rest of the series. This illustrates that these two stages may be eliminated from the system with suitable joinder of corresponding lines, as by joining line 25E with line 23E, or additional stages may be inserted as may be desired in any particular instance. The removal or insertion of a group of two stages has been illustrated for reasons of simplicity, but it will be readily appreciated that the number of stages inserted or removed may be odd as well as even. A similar showing has been made in the series above the main-inlet stage, involving stages 26 and 27, and similar comments apply as have been discussed in connection with the group consisting of stages 23 and 24.

Figure 3:
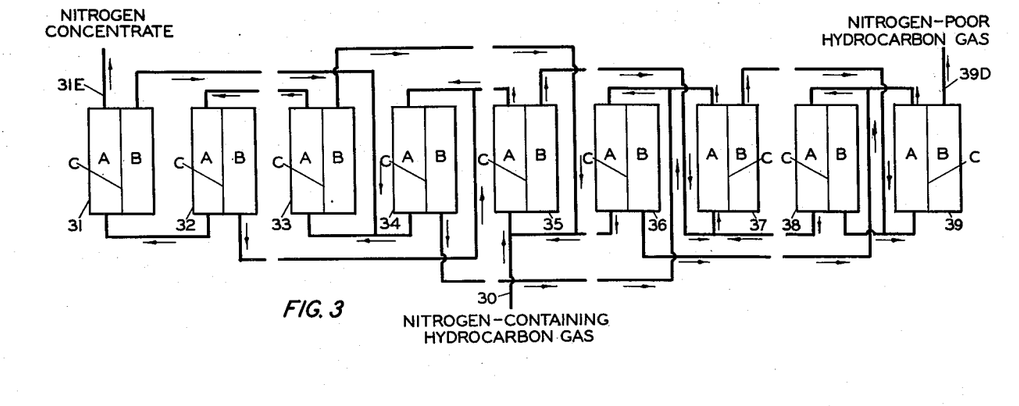

Another modification which is particularly suitable for treating a normally gaseous mixture such as discussed in connection with Figure 2, is shown in Figure 3. Here again a series of nine stages, numbered 31 to 39, is illustrated with charge being introduced to the diffusion zone of intermediate stage 35 through line 30. In this modification the effluent discharged from each of the diffusion zones of each of the entire series of stages is passed to the charge of the diffusion zone of the next lower stage, with a nitrogen concentrate being removed as a product of the process through line 31E. As in the modification shown in the lower stages of Figure 2, the diffusate discharged from each diffusate zone is passed to the charge of the diffusion zone of the second higher separation stage, except that the diffusate from the penultimate stage is passed to the highest stage, with a nitrogen-poor hydrocarbon gas being removed as a product of the process through line 39D. As with the other modifications of my invention, any desirable number of stages, either odd or even, may be used both above and below the main-inlet stage.

Figure 4A:
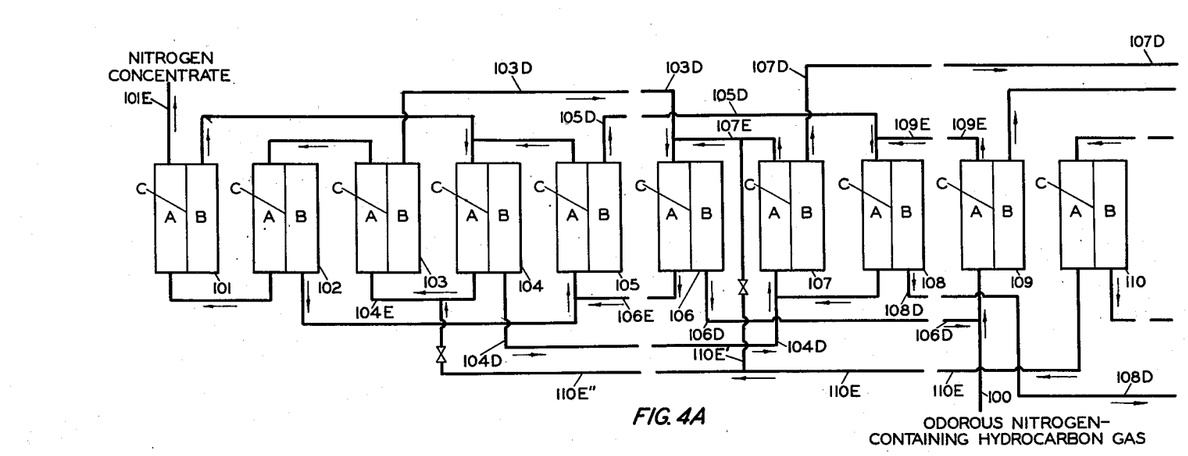
Figure 4B:
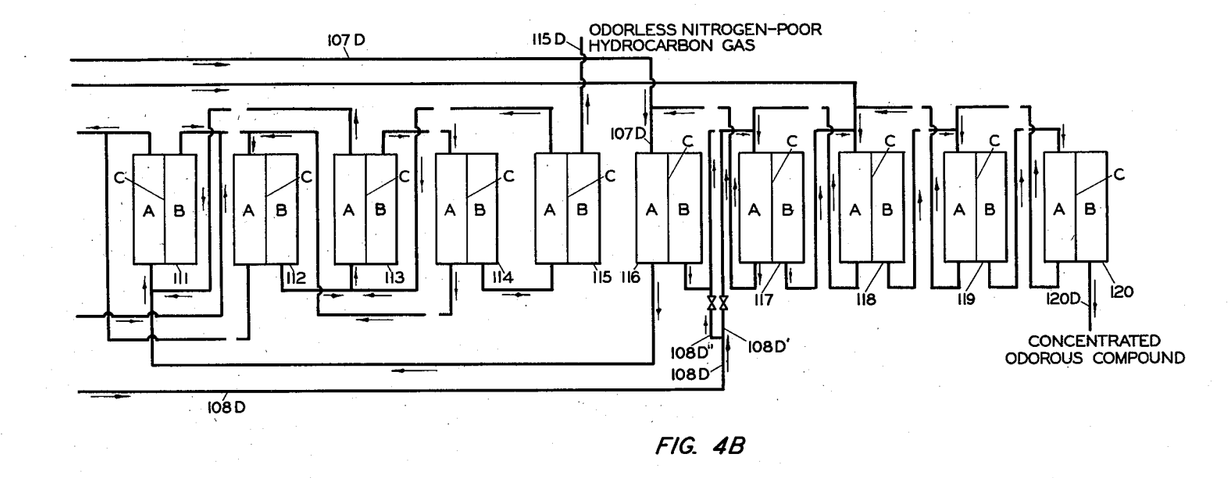

In many instances it will be desired not only to remove nitrogen from a charge gas, such as is treated in the modifications shown in Figures 2 and 3, but also to remove an odorous material, such as hydrogen sulfide and/or methyl mercaptan, or an aldehyde, from such a mixture. An arrangement of diffusion stages by which this can be accomplished is shown in Figures 4A and 4B which, together, make one complete unit. In this modification twenty separation stages are used, numbered 101 to 120. In reality this series of stages is divided into three sections. One section for removing nitrogen is made up primarily of stages 101 to 109, together with a portion of the stages in other sections of the entire series. An odor-removal section is made up primarily of stages 116 to 120, although some stages of the other two sections contribute materially to the operation of this particular section. A hydrocarbon-concentration section is made up primarily of stages 110 to 115, but here again, stages in other sections also contribute materially to the operation of this specific section. A mixture such as one containing about 14 per cent nitrogen, 85 per cent methane and ethane, of which at least 80 per cent is methane, and containing about 1 per cent hydrogen sulfide is charged to the process illustrated in Figure 4 through line 100 to the diffusion zone of the main-inlet stage 109. The effluent discharged from this diffusion zone and from the diffusion zone of each stage lower in this series is passed to the charge of the diffusion zone of the next lowest stage, with an odorless nitrogen concentrate being removed as a product of the process from the diffusion zone of the lowest stage through line 101E. In this specific modification the diffusate discharged from the diffusate zone of each of the stages below the main-inlet stage, except the two immediately below the inlet stage, is passed to the charge of the diffusion zone of the third higher stage. The diffusate discharged from the diffusate zone of the main-inlet stage 109 is passed as the principal charge to an intermediate inlet stage 118 of the odor-concentration section. This section operates substantially as does the apparatus illustrated in Figure 1 when this apparatus is used to remove an odorous material from a substantially nitrogen-free hydrocarbon material. The diffusate passed from the diffusate zone of stage 108 is passed through line 108D to the charge of a diffusion zone in a stage in this odor-concentration section lower than stage 118, such as to the charge of stage 117 through line 108D' or, if stage 117 is omitted or supplemental, to the charge of some other stage through line 108D''. The diffusate from the diffusate zone of stage 107 is passed through line 107D to the charge of the diffusion zone of a stage which is still lower in the odor-concentration section, such as stage 116. A fraction containing the odorous compound, or compounds, in highly concentrated form is discharged from the process from the diffusate zone of the highest stage of the odor-concentration section, as through line 120D.

The effluent discharged from the diffusion zone of the lowest stage in the odor-concentration section is passed as the main charge to the diffusion zone of an intermediate stage of the hydrocarbon-concentration section, such as stage 111. The higher stages in this section operate in the manner illustrated for the higher stages of the process illustrated in Figure 2, with a substantially odorless nitrogen-poor hydrocarbon gas being recovered as a product of the process from the diffusate zone of the highest stage of this section, as through line 115D. The effluent from the diffusion zone of the lowest stage of this hydrocarbon-concentration section is passed to the charge of the diffusion zone of a stage which is lower in the series than any stage from which a diffusate is passed to the odor-concentration section of the entire series, such as by being passed through lines 110E and 110E' to line 107E which enters diffusion zone 106A.

As has been done in connection with Figures 1, 2 and 3, breaks have been indicated in the lines joining various stages to indicate that the number of stages may be increased or decreased at this point. Such an alteration in the number of stages may be readily made by one skilled in the art, in the light of the present disclosure. In view of the somewhat more complicated arrangement of stages below the main-inlet stage a change in operations by eliminating a group of stages, such as stages 106, 107 and 108, is somewhat more complicated. If these three stages were to be eliminated the principles of the operation would not be changed in the least. The material flowing through the first part of line 103D would continue flowing through the last part of line 106D; the material flowing through the first part of 104D would continue flowing through the last part of line 107D; the material flowing through the first part of line 105D would continue to flow through line 108D; and the material flowing through the first part of 109E would continue flowing through the last part of 106E. Likewise, the material flowing through line 110E would continue flowing through line 110E'' instead of through line 110E' as previously discussed.

Although it is believed that more efficient operation results from the arrangements of stages which have been discussed herein, it is to be appreciated that various other modifications and arrangements may be employed in the light of the present disclosure and discussion without departing from the spirit of the invention. When attempting to separate nitrogen from hydrocarbons by employing the principles of the invention, it is preferred to pass the diffusate from any one stage to the diffusion zone of the stage which is a plurality of steps higher in the series, but whether this be to the second higher stage as illustrated in Figures 2 and 3, or to the third higher stages as illustrated in the left-hand portion of Figure 4, or to an even higher stage, will depend upon various factors discussed hereinbefore. The primary factor to be considered is, of course, the similarity of the composition of the diffusate to the composition of the stream to which the diffusate is added. The diffusate should be added to that stream entering a diffusion zone which has a composition most nearly similar to said diffusate. The greater the difference in solubilities, between the hydrocarbons on one hand and the impurities on the other in the material used for membranes, the fewer the total number of stages which will be necessary to effect a given extent of separation, the greater the differences in compositions of diffusate and diffusion-effluent streams from any one stage, and the greater the number of stages to be skipped in passing a diffusate back for admixture with a stream entering a diffusion zone. Likewise, whether or not the effluent from each of the diffusion zones passes to the next lower stage, as illustrated in Figures 1 and 3 and in parts of Figure 4, or whether the effluent from each diffusion zone is passed to the second lower stage, or to an even still lower stage, as illustrated in the right-hand part of Figure 2 and in the hydrocarbon concentration section of Figure 4, will depend upon the same factors discussed hereinbefore. The process can be particularly applied to a normally gaseous mixture comprising 10 to 50 per cent nitrogen (by volume) with the remainder being paraffin hydrocarbons of which at least 80 per cent is methane. The product (hydrocarbon) resulting from treating such a mixture should contain no more than about 5 per cent nitrogen. When the process is used to remove an odorous compound, this will generally not be more than about 5 per cent (by volume) of the charge stock, often not more than about 1 per cent. The hydrocarbon product should be essentially free from the odorous material.

As will be readily appreciated by anyone skilled in the art, a number of compressors and/or pumps will be necessary for the successful operation of any modification of my invention. In some instances it may be possible to operate with no compressor or pump on the effluent discharged from the diffusion zone of the main-inlet stage or from the diffusion zone of any lower stage, but a compressor or pump will be necessary for substantially every other discharged product being passed from any zone of any stage. If it is desired to operate any stage above atmospheric temperature it will, of course, be necessary to supply suitable means for attaining and maintaining such a temperature. Since in many instances a diffusate may need to be increased in pressure by a substantial amount the temperature resulting from heat developed by such a compression may be higher than is suitable for the operation of the stage to which such a compressed diffusate is passed and means will need to be supplied for removing at least a part of heat developed by such a compression. Although vaporization is occurring from the surface of the membrane which bounds each diffusate zone, a process which requires a supply of latent heat, solution is likewise taking place at the surface of the same membrane which bounds the diffusion zone and such solution will generally provide all of the necessary latent heat when the mixtures on each side of the membrane are both in the same physical state. If the material on the diffusion side is liquid it is generally necessary to supply additional heat to maintain a satisfactory temperature of operation. Suitable compressors, pumps, control valves, temperature indicating and/or control devices, heaters, coolers, flow-indicating and control devices, and the like, can be readily supplied by one skilled in the art, in the light of the present disclosure and discussion. Each stage may be composed of two simple chambers divided by a membrane, may be built up in sandwich form composed of three chambers, with the middle chamber being separated from each of the two outer chambers by a membrane, and with the middle chamber being either a diffusion zone or a diffusate zone and the two outer chambers being either diffusate zones or diffusion zones, as the case may be, or the stage may be so constructed that the membrane is cylindrical in shape with either the diffusate zone or the diffusion zone lying within the cylindrical space enclosed by the membrane and the other zone of the stage lying in the space outside of the cylindrical membrane. Various other modifications can be readily adapted by one skilled in the art.

I claim:

1. A process for separating a mixture comprising primarily nitrogen and at least one normally gaseous paraffin hydrocarbon into a nitrogen-poor hydrocarbon-rich fraction and a hydrocarbon-poor nitrogen-rich fraction, which comprises introducing all of said mixture initially into an intermediate stage of a series of at least five diffusion stages, each said stage comprising two zones separated by a non-porous membrane in which paraffin hydrocarbons are more soluble than nitrogen with one of said zones being a diffusion zone receiving a nitrogen-hydrocarbon mixture as a direct charge and discharging a nitrogen-hydrocarbon mixture poorer in hydrocarbons and with the other of said zones being a diffusate zone receiving hydrocarbons only by diffusion through said membrane and discharging a gas having a hydrocarbon to nitrogen ratio higher than that in the charge to said diffusion zone, in the stages below the inlet stage passing a discharge from each of said diffusion zones except that of the lowest stage to the charge of the diffusion zone in the next lower stage of said series and passing a discharged diffusate from each of said diffusate zones to the charge of the diffusion zone of the second higher stage of said series, in the stages above the inlet stage passing a discharge from each of said diffusion zones to the charge of the diffusion zone in the second lower stage of said series and passing a discharged diffusate from each of said diffusate zones except the highest to the charge of the diffusion zone of the next higher stage of said series, removing from said highest stage a hydrocarbon-rich diffusate fraction as a product of the process, and removing from the diffusion zone of the lowest stage of said series a nitrogen-rich fraction as a product of the process.

2. A process for separating a mixture comprising primarily nitrogen and at least one normally gaseous paraffin hydrocarbon into a nitrogen-poor hydrocarbon-rich fraction and a hydrocarbon-poor nitrogen-rich fraction, which comprises introducing all of said mixture initially into an intermediate stage of a series of at least five diffusion stages, each said stage comprising two zones separated by a non-porous membrane in which paraffin hydrocarbons are more soluble than nitrogen with one of said zones being a diffusion zone receiving a nitrogen-hydrocarbon mixture as a direct charge and discharging a nitrogen-hydrocarbon mixture poorer in hydrocarbons and with the other of said zones being a diffusate zone receiving hydrocarbons only by diffusion through said membrane and discharging a gas having a hydrocarbon to nitrogen ratio higher than that in the charge to said diffusion zone, in the stages below the inlet stage passing a discharge from each of said diffusion zones except that of the lowest stage to the charge of the diffusion zone in the next lower stage of said series and passing a discharged diffusate from each of said diffusate zones to the charge of the diffusion zone of a higher stage which is at least the second higher stage of said series, in the stages above the inlet stage passing a discharge from each of said diffusion zones to the charge of the diffusion zone in a lower stage which is at least the second lower stage of said series and passing a discharged diffusate from each of said diffusate zones except the highest to the charge of the diffusion zone of the next higher stage of said series, removing from said highest stage a hydrocarbon-rich diffusate fraction as a product of the process, and removing from the diffusion zone of the lowest stage of said series a nitrogen-rich fraction as a product of the process.

3. The process of claim 2 in which at least 80 per cent of said paraffin hydrocarbons comprise methane, the volume per cent of nitrogen in the charge is between about 50 and about 10 per cent and in the hydrocarbon-rich product is not greater than 5 per cent, the membrane is a substantially unstretched rubber having a thickness between 0.0001 and 0.1 inch, and the temperature of each stage is between about 50 and about 300° F.

4. A process for separating a mixture comprising primarily nitrogen and normally gaseous paraffin hydrocarbons into a nitrogen-poor hydrocarbon-rich fraction and a hydrocarbon-poor nitrogen-rich fraction, which comprises introducing all of said mixture initially into an intermediate stage of a series of at least five diffusion stages, each said stage comprising two zones separated by a non-porous membrane in which paraffin hydrocarbons are more soluble than nitrogen with one of said zones being a diffusion zone receiving a nitrogen-hydrocarbon mixture as a direct charge and discharging a nitrogen-hydrocarbon mixture relatively poorer in hydrocarbons and with the other of said zones being a diffusate zone receiving hydrocarbons only by diffusion through said membrane and discharging a gas having a hydrocarbon to nitrogen ratio higher than that in the charge to said diffusion zone, passing a discharge from each of said diffusion zones except that of the lowest stage to the charge of the diffusion zone in the next lower stage of said series, passing a discharged diffusate from each of said diffusate zones except the first two to the charge of the diffusion zone of the second higher stage of said series, passing a discharged diffusate from the second from the top of said stages to the charge of the diffusion zone of the highest stage, removing from said highest stage a hydrocarbon-rich diffusate fraction as a product of the process, and removing from the diffusion zone of the lowest stage of said series a nitrogen-rich fraction as a product of the process.

5. A process for separating a mixture comprising primarily an undesired compound of the class consisting of nitrogen, oxygen and water and as desired compounds normally gaseous paraffin hydrocarbons into a hydrocarbon-rich fraction and a hydrocarbon-poor fraction, which comprises introducing all of said mixture initially into an intermediate stage of a series of at least five diffusion stages, each said stage comprising two zones separated by a non-porous membrane in which paraffin hydrocarbons are more soluble than said undesired compounds with one of said zones being a diffusion zone receiving such a mixture as a direct charge and discharging a mixture relatively poorer in hydrocarbons and with the other of said zones being a diffusate zone receiving hydrocarbons only by diffusion through said membrane and discharging a gas relatively richer in paraffin hydrocarbons than that in the charge to said diffusion zone, passing a discharge from each of said diffusion zones except that of the lowest stage to the charge of the diffusion zone in the next lower stage of said series, passing a discharged diffusate from each of said diffusate zones except the first two to the charge of the diffusion zone of the second higher stage of said series, passing a discharged diffusate from the second from the top of said stages to the charge of the diffusion zone of the highest stage, removing from said highest stage a hydrocarbon-rich diffusate fraction as a product of the process, and removing from the diffusion zone of the lowest stage of said series a hydrocarbon-poor fraction as a product of the process.

6. The process of claim 4 in which said membrane comprises substantially unstretched rubber having a thickness between about 0.0005 and 0.05 inch, in which the hydrocarbon partial pressure in each said diffusate zone is between about 0.01 and 0.5 times its partial pressure in the corresponding diffusion zone, and in which the temperatures of each said stage is between about 50 and about 200° F.

7. The process of claim 4 in which at least 80 per cent of the paraffin hydrocarbons comprise methane, the volume per cent of nitrogen in the charge is between about 50 and about 10 and the volume per cent of nitrogen in the hydrocarbon product is not greater than 5.

8. A process for separating a mixture comprising primarily nitrogen and normally gaseous paraffin hydrocarbons into a nitrogen-poor hydrocarbon-rich fraction and a hydrocarbon-poor nitrogen-rich fraction, which comprises introducing all of said mixture initially into an intermediate stage of a series of at least three diffusion stages, each said stage comprising two zones separated by a non-porous membrane in which paraffin hydrocarbons are more soluble than nitrogen with one of said zones being a diffusion zone receiving a nitrogen-hydrocarbon mixture as a direct charge and discharging a nitrogen-hydrocarbon mixture relatively poorer in hydrocarbons and with the other of said zones being a diffusate zone receiving hydrocarbons only by diffusion through said membrane and discharging a gas having a hydrocarbon to nitrogen ratio higher than that in the charge to said diffusion zone, passing a discharge from each of said diffusion zones except the lowest to the charge of a diffusion zone of a lower stage of said series, passing a discharged diffusate from each of said diffusate zones except the highest to the charge of a diffusion zone of a higher stage of said series, removing from the diffusion zone of said lowest stage a nitrogen-rich fraction as a product of the process, and removing from said highest stage a hydrocarbon-rich diffusate fraction as a product of the process.

9. A process for separating a mixture comprising primarily an undesired compound of the class consisting of nitrogen, oxygen and water and as desired compounds normally gaseous paraffin hydrocarbons into a hydrocarbon-rich fraction and a hydrocarbon-poor fraction, which comprises introducing all of said mixture initially into an intermediate stage of a series of at least four diffusion stages, each said stage comprising two zones separated by a non-porous membrane in which paraffin hydrocarbons are more soluble than said undesired compounds with one of said zones being a diffusion zone receiving such a mixture as a direct charge and discharging a mixture relatively poorer in hydrocarbons and with the other of said zones being a diffusate zone receiving hydrocarbons only by diffusion through said membrane and discharging a gas relatively richer in paraffin hydrocarbons than that in the charge to said diffusion zone, passing a discharge from each of said diffusion zones except the lowest to the charge of a diffusion zone of a lower stage of said series, passing a discharged diffusate from each of said diffusate zones except at least the two highest to the charge of a diffusion zone of a higher stage which is at least the second higher stage of said series, passing a discharged diffusate from each of said excepted higher stages except the highest to the charge of a higher stage of said series, removing from the diffusion zone of said lowest stage a hydrocarbon-poor fraction as a product of the process, and removing from said highest stage a hydrocarbon-rich diffusate fraction as a product of the process.

10. The process of claim 8 in which at least 80 per cent of said paraffin hydrocarbons comprise methane, the volume per cent of nitrogen in the charge is between about 50 and about 10 per cent and in the hydrocarbon-rich product is not greater than 5 per cent, the membrane is a substantially unstretched rubber having a thickness between 0.0001 and 0.01 inch, and the temperature of each stage is between about 50 and about 200° F.

11. A process for separating a relatively odorless hydrocarbon-rich gas from a normally gaseous mixture containing about 10 to about 50 per cent by volume of nitrogen, not more than about 5 per cent by volume of a volatile non-hydrocarbon odorous compound and the remainder normally gaseous paraffin hydrocarbons, which comprises introducing all of such a mixture into an intermediate main-inlet stage of a series of at least thirteen diffusion stages, each said stage comprising two zones separated by a non-porous membrane in which said nitrogen, paraffin hydrocarbons and odorous compound are soluble with increasing solubility in the order named with one of said zones being a diffusion zone receiving a direct-charge mixture and discharging a discharge mixture relatively poorer in the more-soluble components of said direct charge mixture and with the other of said zones being a diffusate zone receiving components of the first said mixture only by diffusion through said membrane and discharging a gas having a relatively higher proportion of said more-soluble components than the corresponding direct-charge mixture, passing a discharge from the diffusion zone of said inlet stage and from each of said stages lower in said series except the lowest to the charge of the diffusion zone in the next lower stage, passing a discharged diffusate from each of the diffusate zones in stages lower than said inlet, up through the one discharging into said inlet, to the charge of a diffusion zone of a higher stage which is at least the second higher stage of said series, passing a discharged diffusate from said inlet stage to an intermediate stage of an odor-concentrating section of said series of stages, passing a discharge from each of the diffusion zones in the stages of said odor-concentrating section except that of the lowest stage thereof to the charge of the diffusion zone in the next lower stage of said section, passing at least two discharged diffusates from stages below said main inlet stage to the charges of separate diffusion zones of stages in said section below the inlet stage of said section, passing a discharged diffusate from the diffusate zone of each of said stages of said section except that of the highest stage to the charge of a diffusion zone of a higher stage of said section, passing a discharge from the diffusion zone of the lowest stage of said odor-concentrating section to an intermediate stage of a hydrocarbon-concentrating section, passing a discharge from the diffusion zone of each stage of the last said section except from the lowest stage thereof to a lower stage of said section, passing a discharged diffusate from the diffusate zone of each of said stages of the last said section except the highest to the charge of the diffusion zone of a higher stage of said section, passing a discharge from the diffusion zone of the lowest stage of said hydrocarbon-concentration section to the charge of the diffusion zone of a stage below said main-inlet stage which is lower in said series than any stage from which a discharged diffusate is passed to said odor-concentrating section, and removing as products of the entire process a nitrogen-concentrate from the diffusion zone of the lowest stage of the entire series, an odor-concentrate from the diffusate zone of the highest stage of said odor-concentration section, and a hydrocarbon concentrate from the diffusion zone of the highest stage of said hydrocarbon-concentration section.

12. A process for separating a relatively odorless hydrocarbon-rich gas from a normally gaseous mixture containing from about 10 to about 50 per cent by volume of an undesired compound of the class consisting of nitrogen, oxygen and water, not more than about 5 per cent by volume of a volatile non-hydrocarbon odorous compound and the remainder normally gaseous paraffin hydrocarbons, which comprises introducing all of such a mixture into an intermediate main-inlet stage of a series of diffusion stages, each said stage comprising two zones separated by a non-porous membrane in which said undesired compound, paraffin hydrocarbons and odorous compound are soluble with increasing solubility in the order named with one of said zones being a diffusion zone receiving a direct charge mixture and discharging a discharge mixture relatively poorer in the more soluble components of said direct charge mixture and with the other of said zones being a diffusate zone receiving components of the first said mixture only by diffusion through said membrane and discharging a gas having a relatively higher proportion of said more soluble components than the corresponding direct charge mixture, passing a discharge from the diffusion zone of said inlet stage and from each of said stages lower in said series except the lowest to the charge of a diffusion zone in a lower stage, passing a discharged diffusate from each of the diffusate zones in stages lower than said inlet up through the one discharging into said inlet to the charge of a diffusion zone of a higher stage of said series, passing a discharged diffusate from said inlet stage to an intermediate stage of an odor-concentrating section of said series of stages, passing a discharge from each of the diffusion zones in the stages of said odor-concentrating section except that of the lowest stage thereof to the charge of a diffusion zone of a lower stage of said section, passing a discharge diffusate from the diffusate zone of each of said stages of said section except that of the highest stage to a charge of a diffusion zone of a higher stage of said section, passing at least one discharged diffusate from a stage below said main-inlet stage to a charge of a diffusion zone of a stage in said section below the inlet stages of said section, passing a discharge from the diffusion zone of the lowest stage of said odor-concentrating section to an intermediate section of a hydrocarbon-concentrating section, passing a discharge from the diffusion zone of each stage of the last said section except from the lowest stage thereof to a lower stage of said section, passing a discharged diffusate from the diffusate zone of each of said stages of the last said section except the highest to the charge of a diffusion zone of a higher stage of said section, passing a discharge from the diffusion zone of the lowest stage of said hydrocarbon concentration section to the charge of a diffusion zone of a stage below said main-inlet stage which is lower in said series than any stage from which a discharged diffusate is passed to said odor-concentrating section, and removing as products of the entire process a substantially odorless hydrocarbon-poor fraction from the diffusion zone of the lowest stage of the entire series, an odor-concentrated fraction from the diffusate zone of the highest stage of said odor-concentration section, and a hydrocarbon-concentrate from the diffusion zone of the highest stage of said hydrocarbon-concentration section.

JEAN P. JONES.

REFERENCES CITED

The following references are of record in the file of this patent:

UNITED STATES PATENTS

| Number | Name | Date |
|---|---|---|
| 307,042 | Herzog | Oct. 21, 1884 |
| 1,496,757 | Lewis et al. | June 3, 1924 |
| 2,159,434 | Frey | May 23, 1939 |
| 2,388,095 | Stahly | Oct. 30, 1945 |

FOREIGN PATENTS

| Number | Country | Date |
|---|---|---|
| 266,396 | Great Britain | Feb. 23, 1927 |
| 291,576 | Great Britain | June 7, 1928 |